(12) United States Patent
Bowman et al.

(10) Patent No.: US 12,297,936 B2
(45) Date of Patent: *May 13, 2025

(54) METHOD OF INSTALLING A PIPE COUPLING

(71) Applicant: Victaulic Company, Easton, PA (US)

(72) Inventors: Matthew A. Bowman, Palmer, PA (US); Thomas Nunnally, Telford, PA (US)

(73) Assignee: VICTAULIC COMPANY, Easton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,923

(22) Filed: Mar. 10, 2023

(65) Prior Publication Data

US 2023/0235837 A1    Jul. 27, 2023

Related U.S. Application Data

(63) Continuation of application No. 17/510,865, filed on Oct. 26, 2021, now Pat. No. 11,624,461.

(60) Provisional application No. 63/110,433, filed on Nov. 6, 2020.

(51) Int. Cl.
*F16L 21/06*      (2006.01)
*F16L 23/036*     (2006.01)
*F16L 23/08*      (2006.01)

(52) U.S. Cl.
CPC ............ *F16L 21/065* (2013.01); *F16L 23/08* (2013.01); *F16L 23/036* (2013.01)

(58) Field of Classification Search
CPC ......... F16L 21/06; F16L 21/065; F16L 23/04; F16L 23/08; F16L 17/04; F16L 23/036; F16L 2201/10

USPC .......................................................... 285/420
See application file for complete search history.

(56) References Cited

U.S. PATENT DOCUMENTS

| 2,752,173 | A |   | 6/1956 | Kroos |
| 4,639,020 | A |   | 1/1987 | Rung et al. |
| 4,896,902 | A | * | 1/1990 | Weston ................... F16L 17/04 285/420 |

(Continued)

FOREIGN PATENT DOCUMENTS

| DE | 202016000436 U1 | 2/2016 |
| KR | 100647065 B1 | 11/2006 |

(Continued)

OTHER PUBLICATIONS

Shouldered Pipe Jointing System; http://www.victaulic.co.uk; Shouldered May 1996—012A; 12 pages.

(Continued)

*Primary Examiner* — William S. Choi
(74) *Attorney, Agent, or Firm* — Ballard Spahr LLP (57) ABSTRACT

A method of installing a coupling for joining pipe elements uses a pipe coupling having two segments with action surfaces in facing relationship. Attachment elements on each segment, in the form of lugs, accommodate adjustable fasteners which draw the segments together when tightened. Support surfaces on the lugs engage one another and react the fastener force. Stop surfaces are positioned on the lugs adjacent to the support surfaces. Engagement between the stop surfaces provides a visual indication that the coupling has been properly installed.

15 Claims, 9 Drawing Sheets

(56) References Cited

U.S. PATENT DOCUMENTS

| | | | |
|---|---|---|---|
| 5,018,704 | A | 5/1991 | McLennan |
| 5,018,768 | A | 5/1991 | Palatchy |
| 5,758,907 | A | 6/1998 | Dole et al. |
| 6,533,333 | B1 | 3/2003 | Radzik |
| 7,401,819 | B2 * | 7/2008 | Gibb .................. F16L 23/08 |
| 8,136,847 | B2 * | 3/2012 | Madara ................ F16L 17/04 |
| 8,267,432 | B2 | 9/2012 | Madara et al. |
| 2003/0178850 | A1 | 9/2003 | Dole et al. |
| 2005/0212296 | A1 * | 9/2005 | Dole .................. F16L 23/08 285/420 |
| 2005/0253381 | A1 | 11/2005 | Gibb et al. |
| 2008/0169648 | A1 | 7/2008 | Kwon et al. |
| 2010/0289257 | A1 | 11/2010 | Madara et al. |
| 2011/0221189 | A1 | 9/2011 | Dole et al. |
| 2012/0256415 | A1 | 10/2012 | Dole |
| 2012/0256418 | A1 | 10/2012 | Horgan |
| 2013/0125373 | A1 | 5/2013 | Bancroft |
| 2014/0327238 | A1 | 11/2014 | Bowman |
| 2017/0328500 | A1 | 11/2017 | Bowman et al. |
| 2017/0328501 | A1 | 11/2017 | Motoyama |
| 2020/0318763 | A1 | 10/2020 | Aue et al. |
| 2020/0332934 | A1 | 10/2020 | Duncan et al. |

FOREIGN PATENT DOCUMENTS

| | | |
|---|---|---|
| TW | 201009229 A | 3/2010 |
| WO | 2020230029 A1 | 11/2020 |

OTHER PUBLICATIONS

Installation Instructions; Style 107V QuickVic Installation-Ready Rigid Coupling; Victaulic.com; I-107V; 17027 Rev A; Updated Dec. 2021; 8 pages.

Victaulic QuickVic Rigid Coupling Style 107V; Victaulic.com; 06.33; 17189 Rev B; Updated Nov. 2021; 6 pages.

* cited by examiner

METHOD OF INSTALLING A PIPE COUPLING

This application is a continuation of U.S. application Ser. No. 17/510,865, filed Oct. 26, 2021, which application is based upon and claims benefit of priority to U.S. Provisional Application No. 63/110,433, filed Nov. 6, 2020, both applications being hereby incorporated by reference herein.

FIELD OF THE INVENTION

This invention relates to mechanical couplings for joining pipe elements.

BACKGROUND

It is advantageous to use angularly oriented interface surfaces between the segments of a mechanical coupling for grooved pipe to cause the segments to rotate relatively to one another such that the "keys" of the coupling lock into the circumferential grooves of the pipe elements and form a more rigid joint in bending and torsion between them. U.S. Pat. No. 4,639,020 to Rung et al., hereby incorporated by reference herein, discloses an example of such a coupling.

While very effective at creating more rigid joints, such prior art couplings may present challenges during installation, for example, in ease of assembly and the lack of consistent and identical visual indication that a coupling is properly installed in all intended conditions. There is clearly an opportunity to improve such mechanical couplings so they are easier to assemble and provide consistent and unambiguous visual indication confirming proper installation.

SUMMARY

The invention concerns a coupling for joining pipe elements in end to end relation. In an example embodiment the coupling comprises first and second segments attached to one another end to end surrounding a central space for receiving the pipe elements. Each segment comprises a first lug extending from a first end thereof and a second lug extending from a second end thereof. The first and second lugs of the first segment align respectively with the first and second lugs of the second segment. A first adjustable fastener extends between the first lugs and a second adjustable fastener extends between the second lugs. Each segment further comprises a first action surface positioned between the central space and the first lug, and a first support surface positioned on the first lug. The first fastener is positioned between the first action surface and the first support surface. The first action surface and the first support surface are oriented at a first angle transverse to a longitudinal axis of the first fastener. A second action surface is positioned between the central space and the second lug, and a second support surface positioned on the second lug. The second fastener is positioned between the second action surface and the second support surface. The second action surface and the second support surface are oriented at a second angle transverse to a longitudinal axis of the second fastener. The second angle has an opposite slope from the first angle. At least a first stop surface is positioned on the first lug adjacent to the first support surface. The first stop surface is oriented at a third angle having a slope opposite to the first angle. At least a second stop surface is positioned on the second lug adjacent to the second support surface. The second stop surface is oriented at a fourth angle having a slope opposite to the second angle. Upon adjusting the first and second fasteners to draw the first and second segments toward one another, engagement between the first action surfaces at the first ends of the segments and engagement between the second action surfaces at the second ends of the segments rotates the first and second segments in opposite directions relative to one another, and engagement between at least one of the first stop surfaces on the first lugs and the second stop surfaces on the second lugs limits the rotation.

In an example embodiment, the first lugs define a first opening surrounding a first axis oriented perpendicularly to the longitudinal axis of the first fastener and positioned between the first action surfaces and the first support surfaces. The first opening may extend through the first lugs. Further by way of example, the second lugs define a second opening surrounding a second axis oriented perpendicularly to the longitudinal axis of the second fastener and positioned between the second action surfaces and the second support surfaces. The second opening may extend through the second lugs.

In an example embodiment, each one of the first and second adjustable fasteners comprises a nut and bolt. Further by way of example, each of the segments comprises first and second arcuate projections positioned on opposite sides of the segments. Each of the arcuate projections face the central space. Each of the arcuate projections is engageable within circumferential grooves in the pipe elements when the segments are drawn toward one another by the adjustable fasteners. An example embodiment may further comprise a seal positioned within the central space. The seal supports the segments in spaced apart relation sufficient to permit insertion of the pipe elements into the central space without disassembling the coupling. In a practical example the first angle has a slope of 45° and may also have a slope ranging from 30° to 60°. By way of example, the second angle has an equal but opposite slope to the first angle.

The invention further encompasses a coupling for joining pipe elements in end to end relation. An example coupling embodiment comprises first and second segments attached to one another end to end surrounding a central space for receiving the pipe elements. Each segment comprises a first lug extending from a first end thereof and a second lug extending from a second end thereof. The first and second lugs of the first segment align respectively with the first and second lugs of the second segment. A first adjustable fastener extends between the first lugs and a second adjustable fastener extends between the second lugs. Each segment further comprises a first action surface positioned between the central space and the first lug, and a first support surface positioned on the first lug. The first fastener is positioned between the first action surface and the first support surface. The first action surface is oriented perpendicularly to a longitudinal axis of the first fastener, and the first support surface is oriented at a first angle transverse to the longitudinal axis of the first fastener. A second action surface is positioned between the central space and the second lug, and a second support surface is positioned on the second lug. The second fastener is positioned between the second action surface and the second support surface. The second action surface is oriented perpendicularly to a longitudinal axis of the second fastener, and the second support surface is oriented at a second angle transverse to the longitudinal axis of the second fastener. The second angle has an opposite slope from the first angle. At least a first stop surface is positioned on the first lug adjacent to the first support surface. The first stop surface is oriented at a third angle having a slope opposite to the first angle. At least a second stop surface is positioned on the second lug adjacent to the second support surface. The second stop surface is oriented at a fourth angle having a slope opposite to the second angle. Upon adjusting the first and second fasteners to draw the first and second segments toward one another, engagement between at least one of the first stop surfaces on the first lugs and the second stop surfaces on the second lugs arrests rotation of the segments relatively to one another.

In an example embodiment the first lugs define a first opening surrounding a first axis oriented perpendicularly to the longitudinal axis of the first fastener and positioned between the first action surfaces and the first support surfaces. The first opening may extend through the first lugs. Further by way of example the second lugs define a second opening surrounding a second axis oriented perpendicularly to the longitudinal axis of the second fastener and positioned between the second action surfaces and the second support surfaces. The second opening may extend through the second lugs. In a specific example embodiment, each one of the first and second adjustable fasteners comprises a nut and bolt.

In an example embodiment, each of the segments comprises first and second arcuate projections positioned on opposite sides of the segments. Each of the arcuate projections faces the central space. Each of the arcuate projections is engageable within circumferential grooves in the pipe elements when the segments are drawn toward one another by the adjustable fasteners.

An example embodiment may further comprise a seal positioned within the central space. The seal supports the segments in spaced apart relation sufficient to permit insertion of the pipe elements into the central space without disassembling the coupling. In a practical example, the first angle has a slope of 45° and may have a slope ranging from 30° to 60°. In a specific example embodiment the second angle has an equal but opposite slope to the first angle.

The invention also encompasses a coupling for joining pipe elements in end to end relation. In an example embodiment the coupling comprises first and second segments attached to one another end to end surrounding a central space for receiving the pipe elements. Each segment comprises a first lug extending from a first end thereof. The first lug of the first segment aligns with the first lug of the second segment. A first adjustable fastener extends between the first lugs. Each segment further comprises a second end. The second ends of the segments are arranged opposite to the first ends respectively. Each second end is connected to a hinge joining the first and second segments to one another. The hinge defines a hinge axis oriented perpendicularly to a longitudinal axis of the first fastener. The first and second segments are pivotable about the hinge axis. By way of example each segment further comprises a first action surface positioned between the central space and the first lug, and a first support surface positioned on the first lug. The first fastener is positioned between the first action surface and the first support surface. The first action surface is oriented perpendicularly to the longitudinal axis of the first fastener, and the first support surface is oriented at a first angle transverse to the longitudinal axis of the first fastener. A first stop surface is positioned on the first lug adjacent to the first support surface. The first stop surface is oriented at a third angle having a slope opposite to the first angle. Upon adjusting the first fastener to pivot and thereby draw the first and second segments toward one another, engagement between the first stop surfaces on the first lugs arrests rotation of the segments relatively to one another.

In an example embodiment the first lugs define a first opening surrounding a first axis oriented perpendicularly to the longitudinal axis of the first fastener and positioned between the first action surfaces and the first support surfaces. The first opening may extend through the first lugs. In a practical example the first adjustable fastener comprises a nut and bolt.

By way of example, each of the segments comprises first and second arcuate projections positioned on opposite sides of the segments. Each of the arcuate projections faces the central space. Each of the arcuate projections is engageable within circumferential grooves in the pipe elements when the segments are drawn toward one another by the adjustable fastener. A coupling according to the invention may further comprise a seal positioned within the central space. The seal supports the segments in spaced apart relation sufficient to permit insertion of the pipe elements into the central space without disassembling the coupling.

In a practical example, the first angle has a slope of 45° and may have a slope ranging from 30° to 60°.

The invention encompasses a method of installing a coupling for joining pipe elements in end to end relation. In one example embodiment the coupling comprises first and second segments attached to one another end to end surrounding a central space for receiving the pipe elements. Each segment comprises a first lug extending from a first end thereof and a second lug extending from a second end thereof. The first and second lugs of the first segment align respectively with the first and second lugs of the second segment. A first adjustable fastener extends between the first lugs and a second adjustable fastener extends between the second lugs. By way of example each segment further comprises a first action surface positioned between the central space and the first lug, and a first support surface positioned on the first lug. The first fastener is positioned between the first action surface and the first support surface. The first action surface and the first support surface are oriented at a first angle transverse to a longitudinal axis of the first fastener in this example.

A second action surface is positioned between the central space and the second lug, and a second support surface is positioned on the second lug. The second fastener is positioned between the second action surface and the second support surface. The second action surface and the second support surface are oriented at a second angle transverse to a longitudinal axis of the second fastener. The second angle has an opposite slope from the first angle. A first stop surface is positioned on the first lug adjacent to the first support surface. The first stop surface is oriented at a third angle having a slope opposite to the first angle. A second stop surface is positioned on the second lug adjacent to the second support surface. The second stop surface is oriented at a fourth angle having a slope opposite to the second angle. In an example embodiment the method comprises:

tightening the first adjustable fastener until the first stop surfaces contact one another; and thereafter tightening the second adjustable fastener until the second stop surfaces contact one another.

The example method may further comprise:

tightening the first adjustable fastener such that the first action surfaces contact one another before the first stop surfaces contact one another; and thereafter continue tightening the first adjustable fastener such that the first support surfaces contact one another before the first stop surfaces contact one another; and thereafter continue tightening the first adjustable fastener until the first stop surfaces contact one another; and thereafter tightening the second adjustable fastener such that the second action surfaces contact one another before the second stop surfaces contact one another; and thereafter continue tightening the second adjustable fastener such that the second support surfaces contact one another before the second stop surfaces contact one another; and thereafter continue tightening the second adjustable fastener until the second stop surfaces contact one another.

In an example embodiment, each of the first and second adjustable fasteners comprises a nut and bolt, and the tightening steps comprises applying torque to one of the nut or the bolt.

By way of further example each of the segments may comprise first and second arcuate projections positioned on opposite sides of the segments. Each of the arcuate projections face the central space, and each of the arcuate projections is engageable within circumferential grooves in the pipe elements when the segments are drawn toward one another by the adjustable fasteners.

A further example method comprises positioning a seal within the central space. The seal supports the segments in spaced apart relation sufficient to permit insertion of the pipe elements into the central space without disassembling the coupling before the tightening steps.

Another example method of installing a coupling for joining pipe elements in end to end relation uses a coupling comprising first and second segments attached to one another end to end surrounding a central space for receiving the pipe elements. Each segment in this example comprises a first lug extending from a first end thereof and a second lug extending from a second end thereof. The first and second lugs of the first segment align respectively with the first and second lugs of the second segment. A first adjustable fastener extends between the first lugs and a second adjustable fastener extends between the second lugs. A first action surface is positioned between the central space and the first lug, and a first stop surface is positioned on the first lug. The first fastener is positioned between the first action surface and the first stop surface. A second action surface is positioned between the central space and the second lug, and a second stop surface is positioned on the second lug. The second fastener is positioned between the second action surface and the second stop surface. An example method using this coupling comprises:

tightening the first adjustable fastener until the first stop surfaces contact one another; and thereafter tightening the second adjustable fastener until the second stop surfaces contact one another.

The example method may further comprise:

tightening the first adjustable fastener such that the first action surfaces contact one another before the first stop surfaces contact one another; and thereafter continue tightening the first adjustable fastener until the first stop surfaces contact one another; and thereafter tightening the second adjustable fastener such that the second action surfaces contact one another before the second stop surfaces contact one another; and thereafter continue tightening the second adjustable fastener until the second stop surfaces contact one another.

Another example method of installing a coupling for joining pipe elements in end to end relation includes a coupling comprising first and second segments attached to one another end to end surrounding a central space for receiving the pipe elements. Each segment comprises a first lug extending from a first end thereof and a second lug extending from a second end thereof. The first and second lugs of the first segment align respectively with the first and second lugs of the second segment. A first adjustable fastener extends between the first lugs and a second adjustable fastener extends between the second lugs. Each segment may further comprise a first action surface positioned between the central space and the first lug, and a first support surface positioned on the first lug. The first fastener is positioned between the first action surface and the first support surface. A second action surface is positioned between the central space and the second lug, and a second support surface is positioned on the second lug. The second fastener is positioned between the second action surface and the second support surface. A first stop surface is positioned on the first lug adjacent to the first support surface. A second stop surface is positioned on the second lug adjacent to the second support surface. An example method using this coupling comprises:

tightening the first adjustable fastener until the first stop surfaces contact one another; and thereafter tightening the second adjustable fastener until the second stop surfaces contact one another.

The example method may further comprise:

tightening the first adjustable fastener such that the first action surfaces contact one another before the first stop surfaces contact one another; and thereafter continue tightening the first adjustable fastener such that the first support surfaces contact one another before the first stop surfaces contact one another; and thereafter continue tightening the first adjustable fastener until the first stop surfaces contact one another; and thereafter tightening the second adjustable fastener such that the second action surfaces contact one another before the second stop surfaces contact one another; and thereafter continue tightening the second adjustable fastener such that the second support surfaces contact one another before the second stop surfaces contact one another; and thereafter continue tightening the second adjustable fastener until the second stop surfaces contact one another.

DETAILED DESCRIPTION

Figure 1:
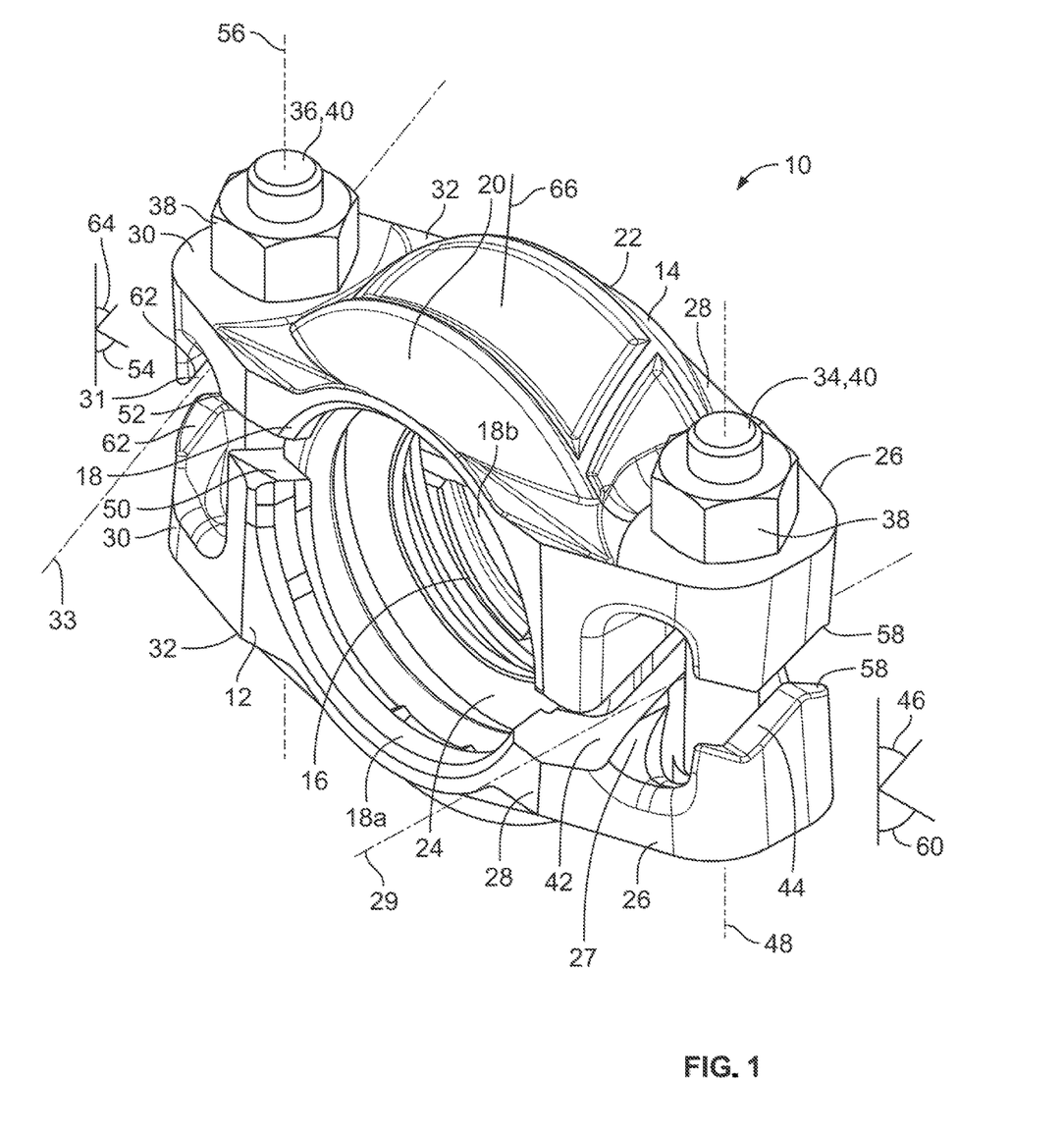
FIG. 1 is an isometric view of an example mechanical coupling according to the invention shown in a factory assembled state.

FIG. 1 shows an example coupling 10 according to the invention for joining pipe elements (not shown) in end to end relation. In this example the coupling 10 comprises a first segment 12 and a second segment 14. Segments 12 and 14 are attached to one another end to end to surround and define a central space 16 for receiving the pipe elements. Coupling 10 is designed to join pipe elements having circumferential grooves at an end and thus each of the segments 12 and 14 comprises first and second arcuate projections 18a and 18b (see also FIG. 2), also known as "keys", positioned on opposite sides 20 and 22 of the segments 12 and 14. The arcuate projections 18a and 18b face the central space 16 and are engageable within circumferential grooves in the pipe elements when the segments are drawn toward one another to form a joint. A seal 24 is positioned within the central space 16. Seal 24 is advantageously a ring gasket made of an elastomer such as EPDM, and may support the segments 12 and 14 in spaced apart relation as shown, at a distance sufficient to permit insertion of the pipe elements into the central space 16 without disassembling the coupling 10. Couplings according to the invention may also be used with plain end pipe, shouldered pipe or other formed pipe ends known in the art.

As further shown in FIG. 1, each segment 12, 14 comprises a first lug 26 extending from first ends 28 thereof. A second lug 30 extends from a second end 32 of each segment. The first and second lugs 26 and 30 of the first segment 12 align respectively with the first and second lugs 26 and 30 of the second segment 14. A first adjustable fastener 34 extends between the first lugs 26 of each segment 12 and 14, and a second adjustable fastener 36 extends between the second lugs 30 of each segment. In this example the first and second adjustable fasteners 34 and 36 comprise a nut 38 and bolt 40.

Figure 2:
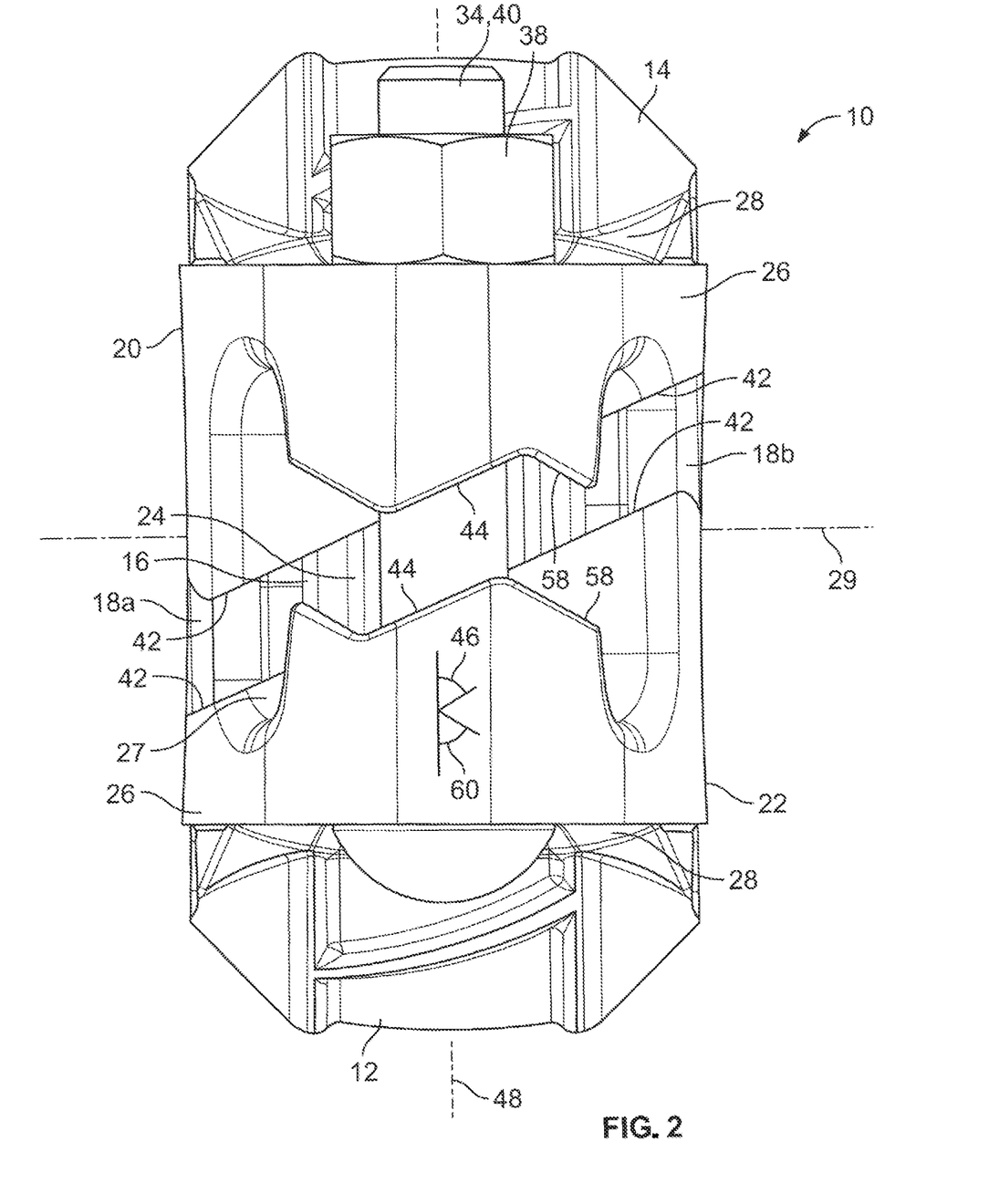
FIG. 2 is an end view of the coupling shown in FIG. 1.

Each segment 12 and 14 further comprises a first action surface 42 positioned between the central space 16 and the first lug 26. A first support surface 44 is positioned on the first lug 26 of each segment 12 and 14. The first fastener 34 is positioned between the first action surfaces 42 and the first support surfaces 44 of the segments 12 and 14. As shown in FIGS. 1 and 2, the first action surfaces 42 and the first support surfaces 44 are oriented at a first angle 46 transverse to a longitudinal axis 48 of the first fastener 34. The first angle 46 may have a slope ranging from 45° to 70°, with a slope of 60° considered advantageous. As shown in FIG. 1, a second action surface 50 is positioned between the central space 16 and the second lug 30 on each segment 12 and 14. A second support surface 52 is positioned on the second lugs 30 of each of the segments 12 and 14. The second fastener 36 is positioned between the second action surfaces 50 and the second support surfaces 52 of the segments 12 and 14. The second action surfaces 50 and the second support surfaces 52 are oriented at a second angle 54 transverse to a longitudinal axis 56 of the second fastener 36. The second angles 54 of the second action surfaces 50 and the second support surfaces 52 have an opposite slope from the first angle 46 of the first action surfaces 42 and the first support surfaces 44. It is advantageous if the slopes of the first and second angles 46 and 54 are also equal in magnitude as well as opposite in sign. Although, in the embodiments disclosed in this specification, the first and second action surfaces 42 and 50 have the same angular orientations as the first and second support surfaces 44 and 52 respectively, a practical design may also advantageously have action surfaces with orientation angles which differ from the orientation angles of their adjacent associated support surfaces.

At least a first stop surface 58 is positioned on the first lugs 26 of each segment 12 and 14 adjacent to the first support surfaces 44. The first stop surfaces 58 are oriented at a third angle 60 (see FIG. 1) having a slope opposite to the slope of the first angle 46. At least a second stop surface 62 is positioned on the second lugs 30 of each segment 12, 14 adjacent to the second support surfaces 52. The second stop surfaces 62 are oriented at a fourth angle 64 having a slope opposite to the second angle 54.

Advantageously, the first lugs 26 may define a first opening 27 surrounding a first axis 29 oriented perpendicularly to the longitudinal axis 48 of the first fastener 34 and positioned between the first action surfaces 42 and the first support surfaces 44. In a practical embodiment, the first opening 27 extends through the first lugs 26. The bending stiffness of the first lugs 26 may be tuned to a desired value by properly sizing the first opening 27. Similarly, the second lugs 30 may define a second opening 31 surrounding a second axis 33 oriented perpendicularly to the longitudinal axis 56 of the second fastener 36 and positioned between the second action surfaces 50 and the second support surfaces 52. In a practical embodiment, the second opening 31 extends through the second lugs 30. The bending stiffness of the second lugs 30 may be tuned to a desired value by properly sizing the second opening 31.

Figure 3:
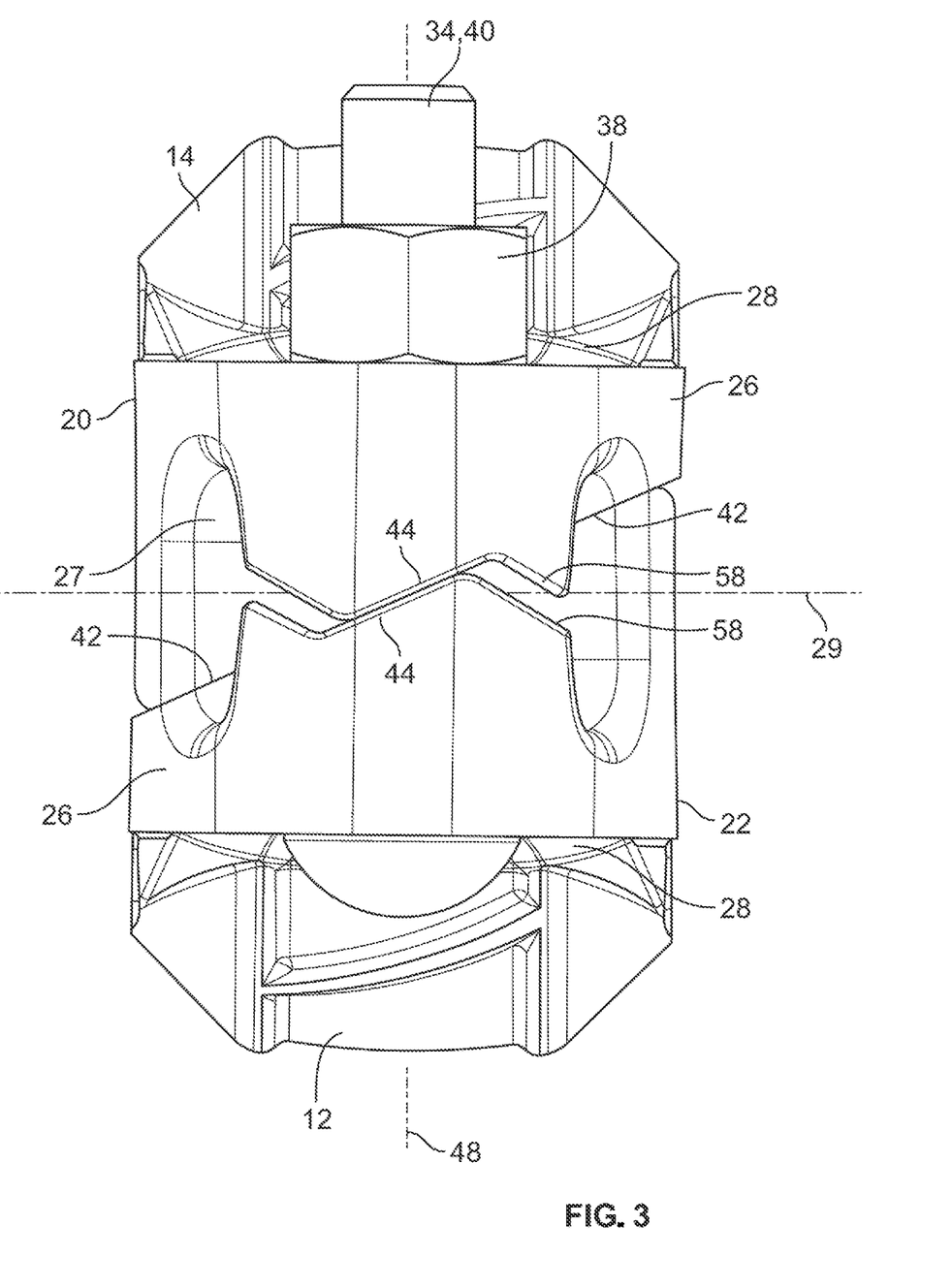
FIGS. 3 and 4 show end views of the example coupling during installation.

Operation of coupling 10 is described with reference to FIGS. 1-4. FIGS. 1 and 2 show the example coupling 10 in the factory assembled configuration with segments 12 and 14 supported in spaced apart relation on seal 24 at a distance from one another sufficient to permit pipe elements (not shown) to be inserted into the central space 16. In this factory assembled example fasteners 34 and 36 have been tightened sufficiently to hold the segments against the seal. The pipe elements are inserted into central space 16 and their circumferential grooves are aligned with the arcuate projections 18a and 18b on opposite sides 20 and 22 of the segments 12 and 14. Fasteners 34 and 36 are then further tightened to draw segments 12 and 14 toward one another. FIG. 3 shows the point when the first and second action surfaces 42 and 50 on segments 12 and 14 engage one another (42 shown). Advantageously, support surfaces 44 and 52 on each segment engage at approximately the same time (44 shown). Arcuate projections 18a and 18b (not visible in the figure) are also engaged within the grooves of the pipe elements at this point as well. During correct installation of coupling 10, engagement of the support surfaces 44 and 52 between the segments 12 and 14 provide a first visual indication confirming that correct installation is proceeding.

Figure 4:
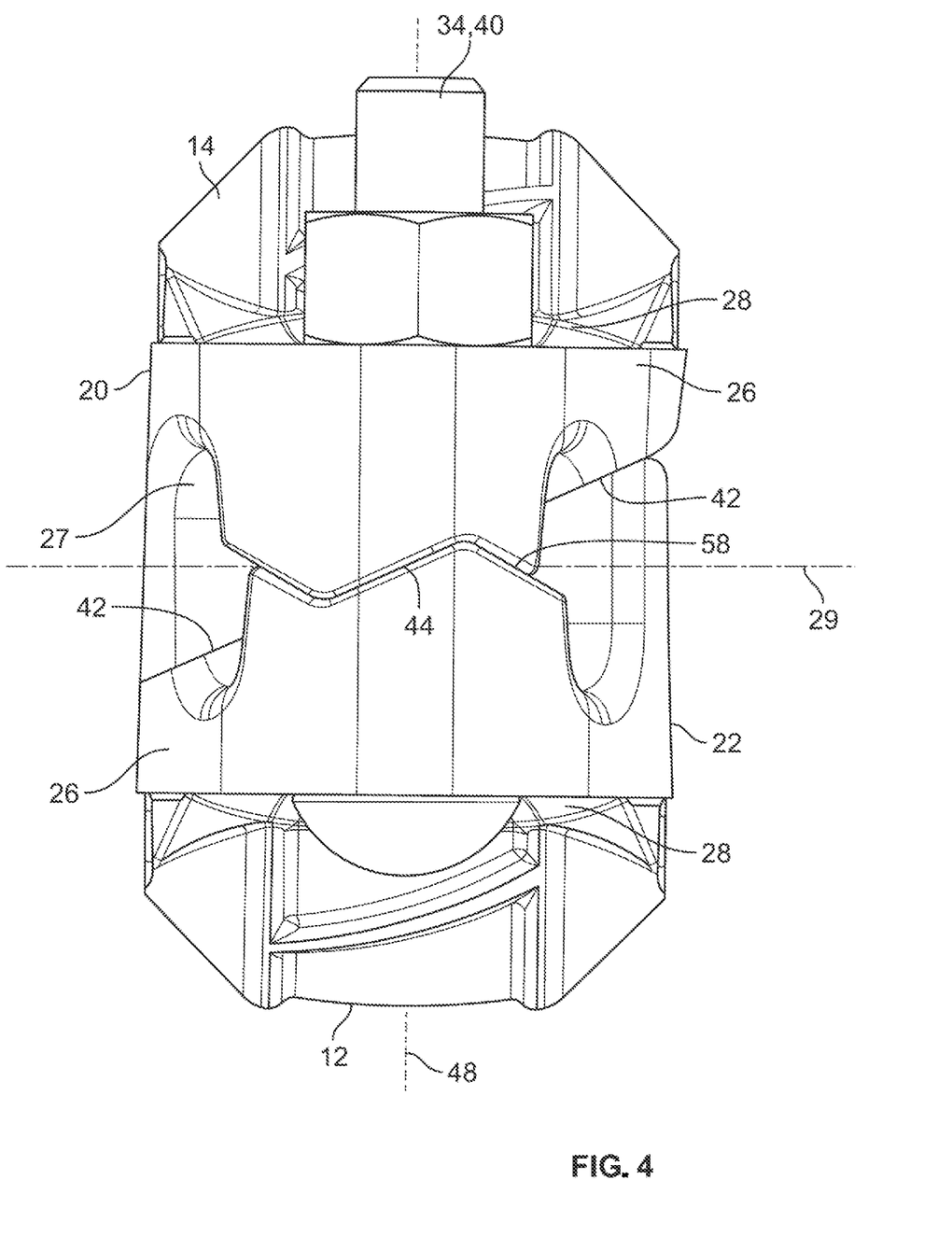
Figure 5:
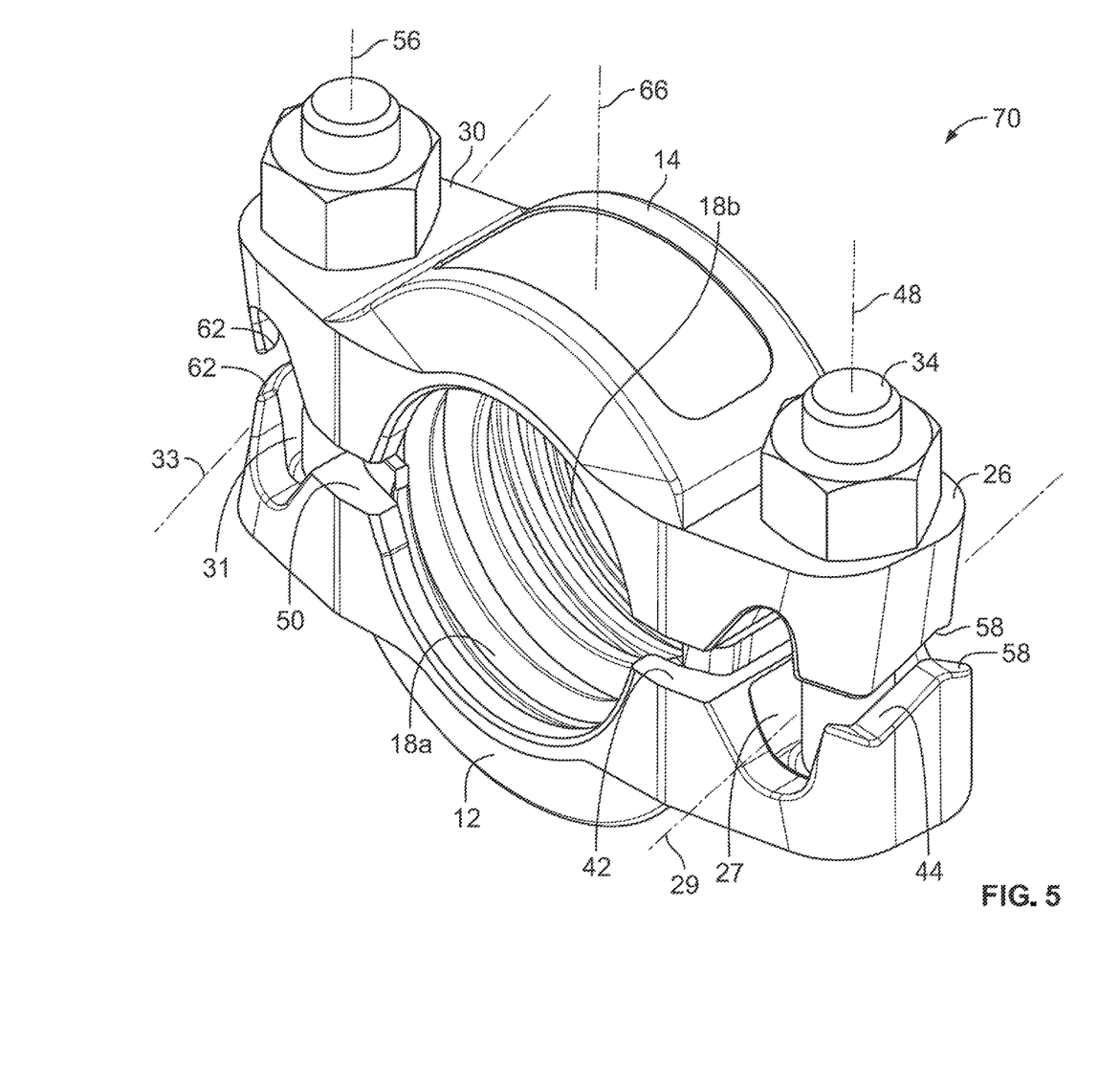
FIG. 5 is an isometric view of another example mechanical coupling according to the invention shown in a factory assembled state.
Figure 6:
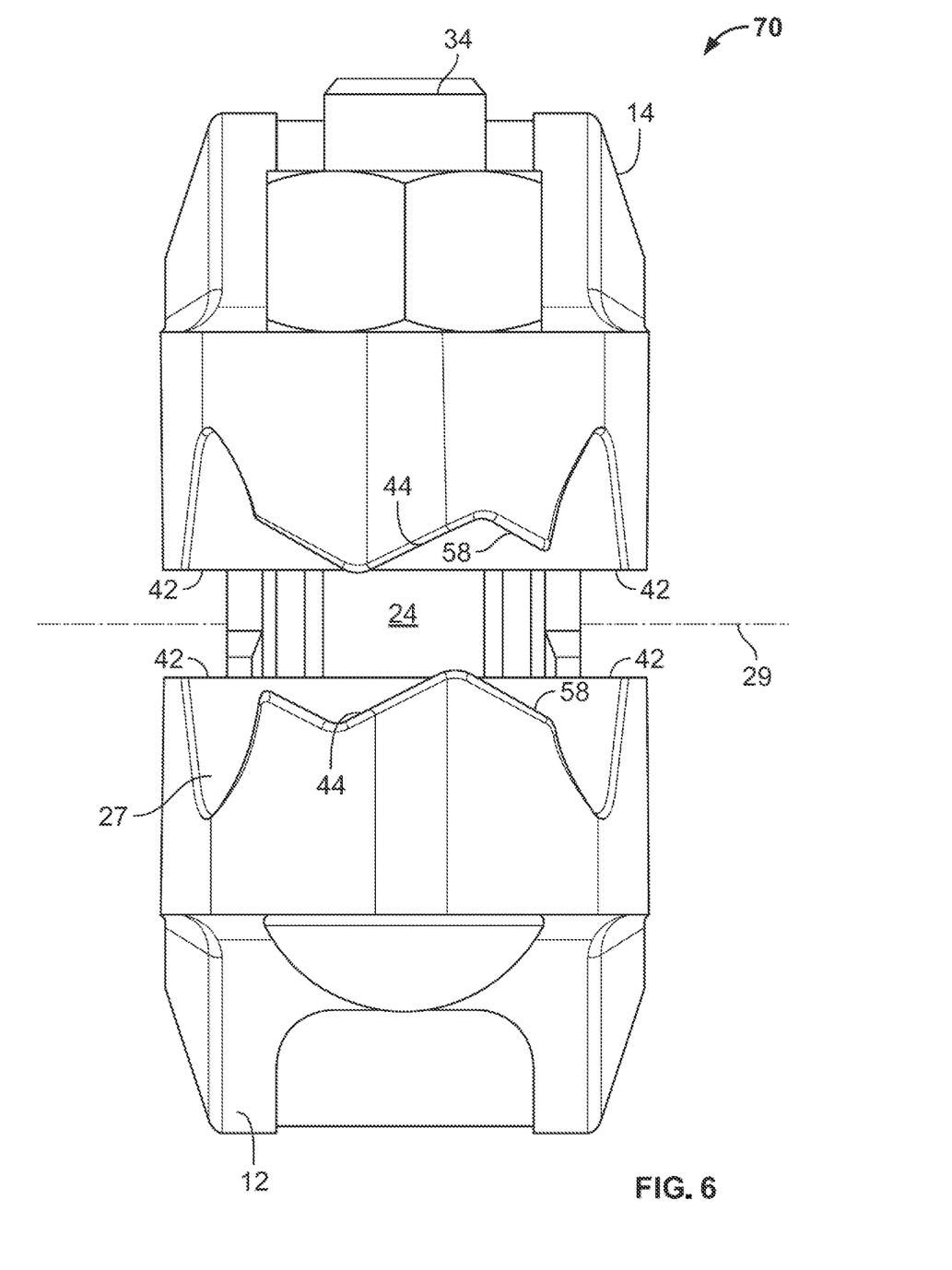
FIG. 6 is an end view of the coupling shown in FIG. 5.

The angular orientation and opposite slopes of the action surfaces 42 and 50 and the support surfaces 44 on the first end 28 of the segments and support surfaces 52 on the second end 30 cause the segments 12 and 14 to rotate in opposite directions relatively to one another as fasteners 34 and 36 are further tightened. FIG. 1 illustrates the axis of rotation 66 of the segments as the pair of action surfaces 42 and the pair of action surfaces 50 on each segment engage one another. The object of this rotation is to force the arcuate projections 18a and 18b to securely contact the sidewalls and/or the floors of the circumferential grooves of the pipe elements which they engage and thereby increase the rigidity of the joint in bending, axial loading, and torsion. Note, however, that the action surfaces 42 and 50 have no feature which limits the degree of relative rotation between the segments 12 and 14 as the fasteners are tightened. A feature which limits the relative rotation between the segments 12 and 14 is provided by the respective stop surfaces 58 and 62 on the lugs 26 and 30. As shown in FIG. 4, these stop surfaces (58 shown) engage as the fasteners are further tightened. The geometry of the action surfaces 42 and 50, the support surfaces 44 and 52, and the stop surfaces 58 and 62, their lengths, positions on the segments and orientation angles are coordinated with the arcuate projections 18a and 18b such that the projections lock up effectively within the circumferential grooves of the pipe elements when the first stop surfaces 58 and the second stop surfaces 62 respectively engage, or nearly engage as depicted in FIG. 4. Thus engagement of both stop surfaces 58 and 62 on opposite ends of the segments 12 and 14 provides visual confirmation that the coupling 10 has been properly installed. The stop surface 58 and 62 provide this confirmation over the entire tolerance range imposed on the circumferential grooves in the pipe elements. At one end of the groove tolerance range the segments 12 and 14 rotate about axis 66 to the limit imposed by respective engagement between the first stop surfaces 58 and the second stop surfaces 62. At the other end of the groove tolerance range engagement between one or both projections 18a and 18b and their respective circumferential grooves impose the limit on segment rotation. It is conceivable that when engagement between the projections 18a and 18b and the grooves limits segment relative rotation that one or both of the first and second stop surfaces 58 and 62 will not be engaged. However, the lugs 26 and 30 at opposite ends of the segments 12 and 14 are designed to deform when fasteners 34 and 36 are tightened once the rotational limit imposed by engagement between the projections 18a and 18b and their circumferential grooves is reached to permit the stop surfaces 58 and 62 to engage. The deformation is controlled in part by the size of the openings 27 and 29 which extend through the lugs 26 and 30. Thus, regardless of where the circumferential grooves in the pipe elements fall on the tolerance spectrum the technician needs merely to tighten the fasteners 34 and 36 until the stop surfaces 58 and 62 on respective lugs 26 and 30 at respective opposite ends 28 and 32 of segments 12 and 14 engage. This engagement provides a final visual confirmation that the coupling 10 has been properly installed.

In addition to being readily visually inspected to confirm a proper joint, couplings 10 according to the invention are also relatively insensitive to the installation procedure, affording greater ease of assembly. While a preferred installation practice is to partially tighten each fastener in a series of alternating steps, this practice may not always be followed. Instead, a technician may apply a powered impact wrench and fully tighten one fastener and then the other. However, with couplings 10 according to the invention this practice does not result in over-rotation of the coupling segments, which is prevented by engagement of the stop surfaces on the side of the one fastener which is first tightened. The technician may then apply torque to tighten the other fastener to bring the stop surfaces on the opposite end of the coupling into engagement to complete the installation. The geometry of the couplings is such that as long as both sets of stop surfaces 58 and 62 are in contact, the projections 18a and 18b will be securely engaged within their respective circumferential grooves, in contact with the groove sidewalls and/or floors to form a rigid joint.

Figure 7:
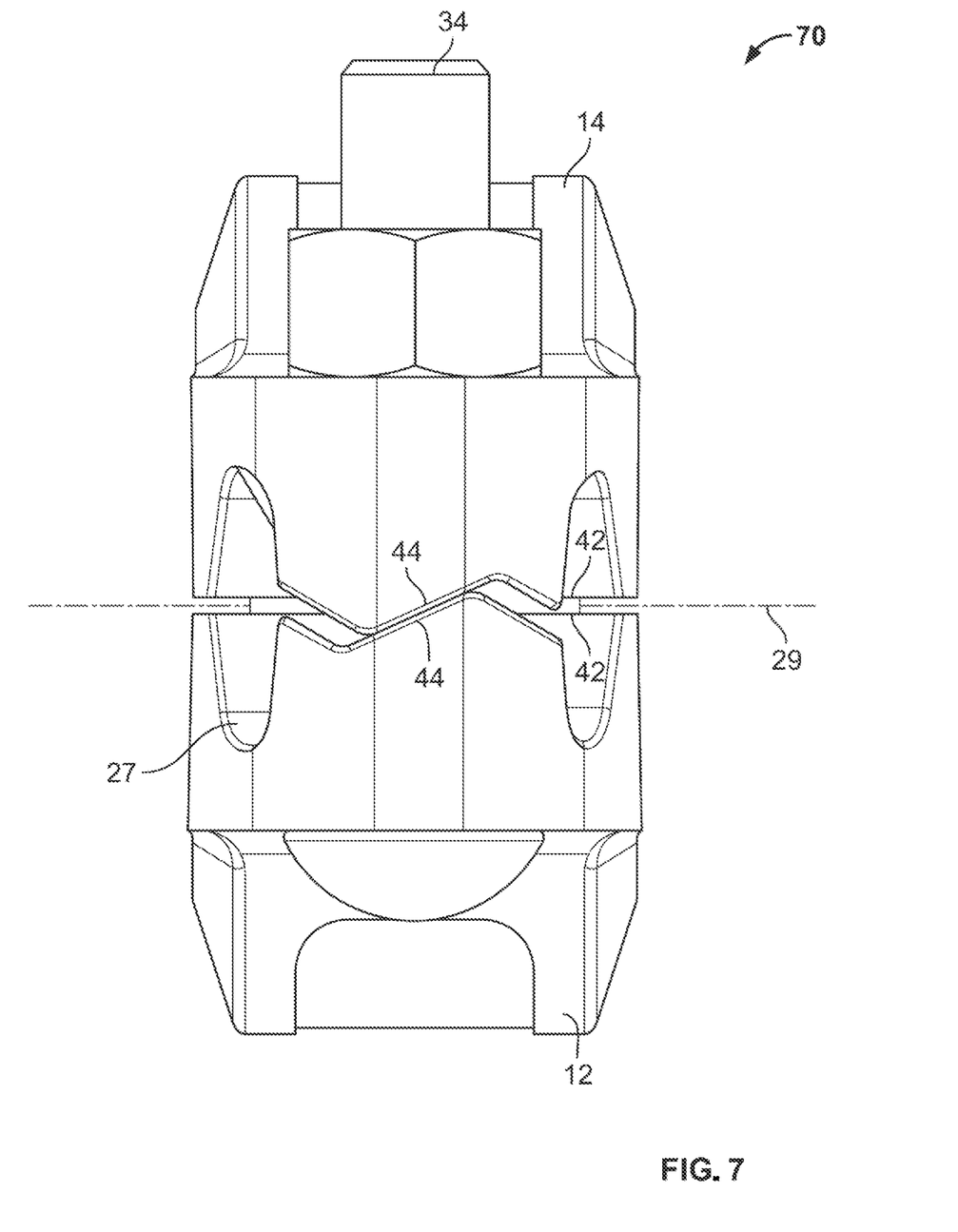
FIGS. 7 and 8 show end views of the example coupling during installation.
Figure 8:
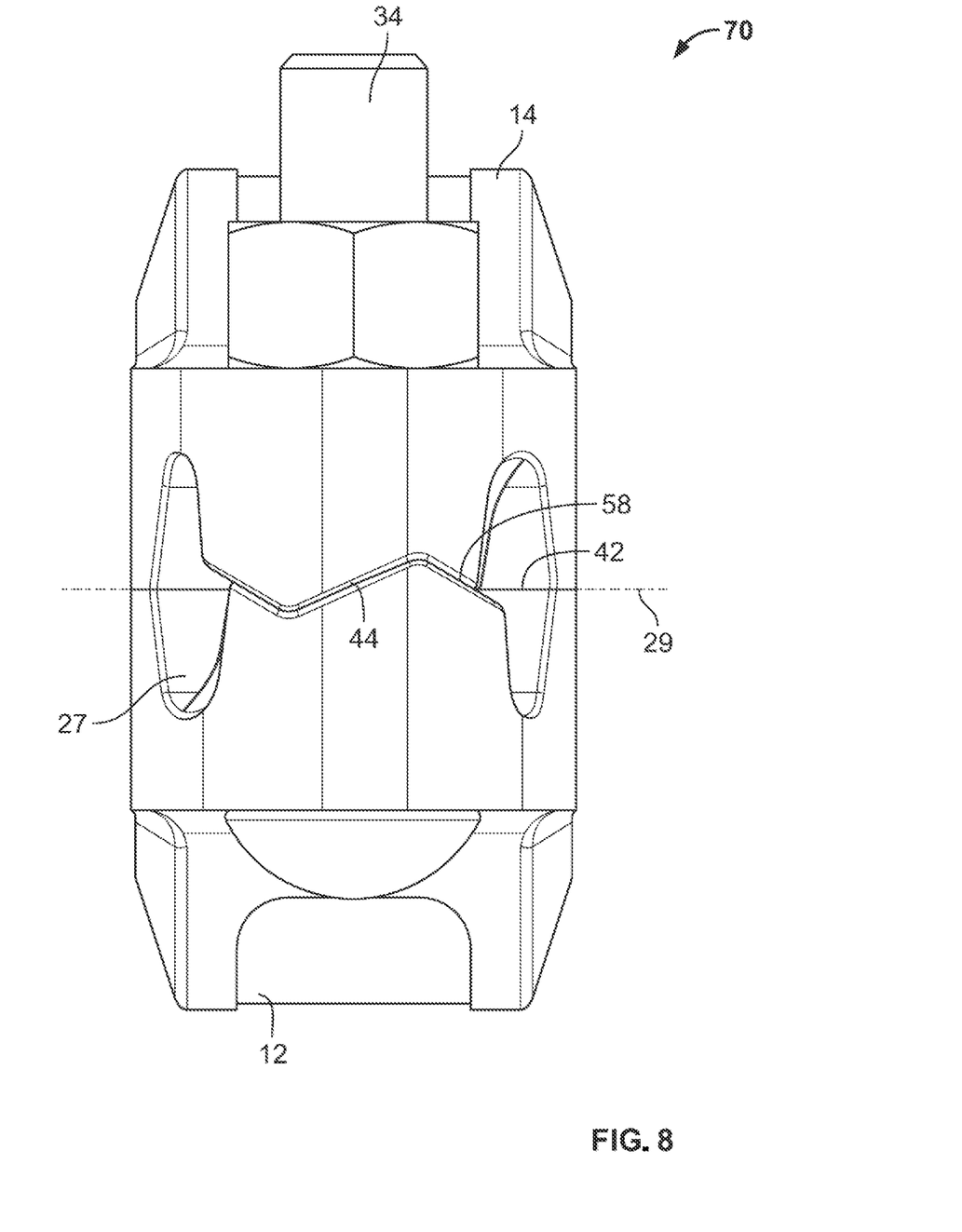

FIGS. 5-8 illustrate another example embodiment of a coupling 70 according to the invention. Coupling 70 is identical to coupling 10 as described above except for the orientation of the action surfaces 42 and 50. In coupling 70, the first action surface 42 is oriented substantially perpendicularly to the longitudinal axis 48 of the first fastener 34 and the second action surface 50 is oriented substantially perpendicularly to the longitudinal axis 56 of said second fastener 36. Due to the different orientation of the action surfaces 42 and 50 the coupling segments 12 and 14 do not rotate about axis 66 upon their engagement when the fasteners 34 and 36 are tightened to bring the segments toward one another to couple pipe elements to one another. Coupling 70 is advantageous when a more flexible pipe joint is desired. However, when the fasteners 34 and 36 are tightened, friction between the torqued fastener and its respective lug tends to rotate the coupling segments relatively to one another, thereby causing unwanted engagement between the projections 18a and 18b and the grooves in the pipe elements. As shown in FIGS. 7 and 8, this unwanted effect is mitigated by engagement between one or both of the stop surfaces 58 and 62 on the lugs 26 and 30 because the geometry of the support surfaces 44 and 52, and the stop surfaces 58 and 62, their lengths, positions on the segments and orientation angles are coordinated with the arcuate projections 18a and 18b such that the projections will not lock up within the circumferential grooves of the pipe elements when the first stop surfaces 58 and the second stop surfaces 62 respectively engage. Engagement between the stop surfaces and support surfaces may also serve as final visual confirmation that the coupling 70 has been properly installed.

Figure 9:
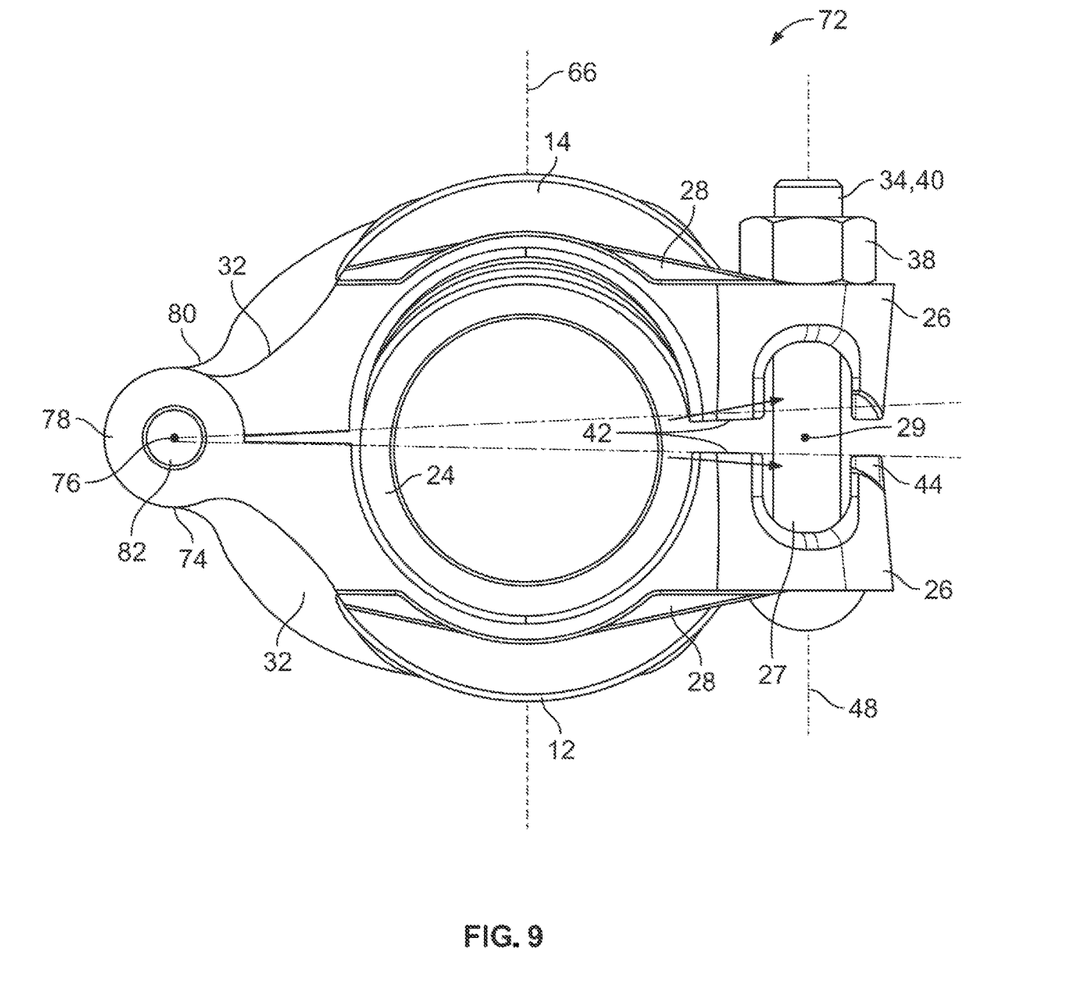
FIG. 9 is a front view of another example embodiment of a coupling according to the invention.

FIG. 9 illustrates another example embodiment of a coupling 72 according to the invention. Coupling 72 shares many of the features of coupling embodiments 10 and 70 as described above but substitutes a hinge in place of the second lugs 30. The second ends 32 of each segment 12 and 14, arranged opposite to the first ends 28, are connected to a hinge 74 joining the first and second segments to one another. The hinge 74 defines a hinge axis 76 oriented perpendicularly to the longitudinal axis 48 of the first fastener 34. The first and second segments 12 and 14 are pivotable about the hinge axis 76. Adjusting the first fastener 34 pivots and thereby draws the first and second segments 12 and 14 toward one another, and engagement between the first stop surfaces 58 on the first lugs 26 (see FIG. 8) arrests rotation of the segments relatively to one another about the axis 66. In this example embodiment, hinge 74 comprises bearings 78 (shown) and 80 (hidden) rotatably joined by a hinge pin 82. Other forms of hinged joints are also practical.

As for coupling 70, the first action surfaces 42 of coupling 74 are oriented substantially perpendicularly to the longitudinal axis 48 of the first fastener 34. Due to the perpendicular orientation of the action surfaces 42, the coupling segments 12 and 14 do not rotate relatively to one another about axis 66 upon their engagement when the fastener 34 is tightened to bring the segments toward one another to couple pipe elements to one another. Like coupling 70, coupling 74 is advantageous when a more flexible pipe joint is desired. When the fastener 34 is tightened, friction between the torqued fastener and its respective lug tends to rotate the coupling segments relatively to one another, thereby causing unwanted engagement between the projections 18a and 18b and the grooves in the pipe elements. Similar to coupling 70 and shown in FIGS. 7 and 8 (which also illustrate lugs 26 of coupling 74), this unwanted effect is mitigated by engagement between one or both of the stop surfaces 58 on the lugs 26 because the geometry of the support surfaces 44 and the stop surfaces 58, their lengths, positions on the segments and orientation angles are coordinated with the arcuate projections 18a and 18b such that the projections will not lock up within the circumferential grooves of the pipe elements when the first stop surfaces 58 engage. Engagement of the stop surfaces also prevents unwanted torsion loads on the hinge about an axis perpendicular to rotation axis 76. Engagement between the stop surfaces and support surfaces may also serve as final visual confirmation that the coupling 74 has been properly installed. The stop surfaces provide this confirmation over the entire tolerance range imposed on the diameter of the circumferential grooves in the pipe elements.

As with couplings 10 and 70, the first lugs 26 of coupling 74 define a first opening 27 surrounding a first axis 29 oriented perpendicularly to the longitudinal axis 48 of the first fastener 34. Axis 48 and fastener 34 are positioned between the first action surfaces 42 and the first support surfaces 44. In the example embodiment shown the first opening 27 extends through said first lugs 26. In a practical embodiment, the first adjustable fastener 34 may comprise a nut 38 and bolt 40.

The invention also encompasses a method of installing a coupling 10 as described herein for joining pipe elements in end to end relation. In an example embodiment the method comprises:

tightening the first adjustable fastener 34 until the first stop surfaces 58 contact one another; and thereafter tightening the second adjustable fastener 36 until the second stop surfaces 62 contact one another.

The dimensional relationship between the coupling segments 12 and 14 and the pipe elements may be such that additional method steps are employed. Such method steps may comprise:

tightening the first adjustable fastener 34 such that the first action surfaces 42 contact one another before the first stop surfaces 58 contact one another; and thereafter continue tightening the first adjustable fastener 34 such that the first support surfaces 44 contact one another before the first stop surfaces 58 contact one another; and thereafter continue tightening the first adjustable 45 fastener until the first stop surfaces 58 contact one another; and thereafter tightening the second adjustable fastener 36 such that the second action surfaces 50 contact one another before the second stop surfaces 62 contact one another; and thereafter continue tightening the second adjustable fastener 36 such that the second support surfaces 52 contact one another before the second stop surfaces 62 contact one another; and thereafter continue tightening the second adjustable fastener 36 until the second stop surfaces 62 contact one another.

When each of the first and second adjustable fasteners comprises a nut and bolt, the tightening steps comprising applying torque to one of the nut or the bolt. When coupling 10 couples grooved pipe elements, each of the segments 12 and 14 may comprise first and second arcuate projections 18a and 18b positioned on opposite sides of the segments. Each of the arcuate projections is engageable within circumferential grooves in the pipe elements when the segments are drawn toward one another upon tightening of the adjustable fasteners 34 and 36. A seal may further be positioned within the central space 16. The seal may support the segments in spaced apart relation sufficient to permit insertion of the pipe elements into the central space without disassembling the coupling before the tightening steps.

Another example method of installing a coupling 10 for joining pipe elements in end to end relation comprises:

tightening the first adjustable fastener 34 such that the first action surfaces 42 contact one another before the first stop surfaces 58 contact one another; and thereafter continue tightening the first adjustable fastener 34 until the first stop surfaces 58 contact one another; and thereafter tightening the second adjustable fastener 36 such that the second action surfaces 50 contact one another before the second stop surfaces 58 contact one another; and thereafter continue tightening the second adjustable fastener 36 until the second stop surfaces 62 contact one another.

In another example method of installing a coupling 10 for joining pipe elements in end to end relation the method comprises:

tightening the first adjustable fastener 34 such that the first support surfaces 44 contact one another before the first stop surfaces 58 contact one another; and thereafter continue tightening the first adjustable fastener 34 until the first stop surfaces 58 contact one another; and thereafter tightening the second adjustable fastener 36 such that the second support surfaces 52 contact one another before the second stop surfaces 58 contact one another; and thereafter continue tightening the second adjustable fastener 36 until the second stop surfaces 58 contact one another.

It is expected that couplings according to the invention will permit both rigid and flexible joints to be formed easily and reliably while reducing the coupling's sensitivity to poor installation techniques.

What is claimed is:

1. A method of installing a coupling for joining pipe elements in end to end relation, said coupling comprising:

first and second segments attached to one another end to end surrounding a central space for receiving said pipe elements, each said segment comprising a first lug extending from a first end thereof and a second lug extending from a second end thereof, said first and second lugs of said first segment aligning respectively with said first and second lugs of said second segment;

a first adjustable fastener extending between said first lugs and a second adjustable fastener extending between said second lugs;

a first action surface positioned between said central space and said first lug, and a first stop surface positioned on said first lug, said first fastener being positioned between said first action surface and said first stop surface;

a second action surface positioned between said central space and said second lug, and a second stop surface positioned on said second lug, said second fastener being positioned between said second action surface and said second stop surface;

said method comprising:

with said coupling in a factory assembled configuration in which said first and second segments of said coupling are in spaced apart relation at a distance from one another sufficient to permit said pipe elements to be inserted while said segments are coupled via said first and second adjustable fasteners, tightening said first adjustable fastener until said first stop surfaces contact one another; and thereafter tightening said second adjustable fastener until said second stop surfaces contact one another.

2. The method according to claim 1, further comprising:

tightening said first adjustable fastener such that said first action surfaces contact one another before said first stop surfaces contact one another; and thereafter continue tightening said first adjustable fastener until said first stop surfaces contact one another; and thereafter tightening said second adjustable fastener such that said second action surfaces contact one another before said second stop surfaces contact one another; and thereafter continue tightening said second adjustable fastener until said second stop surfaces contact one another.

3. The method according to claim 1, wherein each of said first and second adjustable fasteners comprises a nut and bolt, said tightening steps comprising applying torque to one of said nut or said bolt.

4. The method according to claim 1, wherein each of said segments comprises first and second arcuate projections positioned on opposite sides of said segments, each of said arcuate projections facing said central space, each of said arcuate projections being engageable within circumferential grooves in said pipe elements when said segments are drawn toward one another by said adjustable fasteners.

5. The method according to claim 1, further comprising positioning a seal within said central space, said seal supporting said segments in spaced apart relation sufficient to permit insertion of said pipe elements into said central space without disassembling said coupling before said tightening steps.

6. A method of installing a coupling for joining pipe elements in end to end relation, said coupling comprising:
first and second segments attached to one another end to end surrounding a central space for receiving said pipe elements, each said segment comprising a first lug extending from a first end thereof and a second lug extending from a second end thereof, said first and second lugs of said first segment aligning respectively with said first and second lugs of said second segment;
a first adjustable fastener extending between said first lugs and a second adjustable fastener extending between said second lugs; wherein
each said segment further comprises:
a first action surface positioned between said central space and said first lug, and a first support surface positioned on said first lug, said first fastener being positioned between said first action surface and said first support surface, said first action surface and said first support surface being oriented at a first angle transverse to a longitudinal axis of said first fastener;
a second action surface positioned between said central space and said second lug, and a second support surface positioned on said second lug, said second fastener being positioned between said second action surface and said second support surface, said second action surface and said second support surface being oriented at a second angle transverse to a longitudinal axis of said second fastener, said second angle having an opposite slope from said first angle;
a first stop surface positioned on said first lug adjacent to said first support surface, said first stop surface being oriented at a third angle having a slope opposite to said first angle;
a second stop surface positioned on said second lug adjacent to said second support surface, said second stop surface being oriented at a fourth angle having a slope opposite to said second angle;
said method comprising:
tightening said first adjustable fastener until said first stop surfaces contact one another; and thereafter
tightening said second adjustable fastener until said second stop surfaces contact one another.

7. The method according to claim 6, further comprising:
tightening said first adjustable fastener such that said first action surfaces contact one another before said first stop surfaces contact one another; and thereafter
continue tightening said first adjustable fastener such that said first support surfaces contact one another before said first stop surfaces contact one another; and thereafter
continue tightening said first adjustable fastener until said first stop surfaces contact one another; and thereafter
tightening said second adjustable fastener such that said second action surfaces contact one another before said second stop surfaces contact one another; and thereafter
continue tightening said second adjustable fastener such that said second support surfaces contact one another before said second stop surfaces contact one another; and thereafter
continue tightening said second adjustable fastener until said second stop surfaces contact one another.

8. The method according to claim 6, wherein each of said first and second adjustable fasteners comprises a nut and bolt, said tightening steps comprising applying torque to one of said nut or said bolt.

9. The method according to claim 6, wherein each of said segments comprises first and second arcuate projections positioned on opposite sides of said segments, each of said arcuate projections facing said central space, each of said arcuate projections being engageable within circumferential grooves in said pipe elements when said segments are drawn toward one another by said adjustable fasteners.

10. The method according to claim 6, further comprising positioning a seal within said central space, said seal supporting said segments in spaced apart relation sufficient to permit insertion of said pipe elements into said central space without disassembling said coupling before said tightening steps.

11. A method of installing a coupling for joining pipe elements in end to end relation, said coupling comprising:
first and second segments attached to one another end to end surrounding a central space for receiving said pipe elements, each said segment comprising a first lug extending from a first end thereof and a second lug extending from a second end thereof, said first and second lugs of said first segment aligning respectively with said first and second lugs of said second segment;
a first adjustable fastener extending between said first lugs and a second adjustable fastener extending between said second lugs; wherein
each said segment further comprises:
a first action surface positioned between said central space and said first lug, and a first support surface positioned on said first lug, said first fastener being positioned between said first action surface and said first support surface;
a second action surface positioned between said central space and said second lug, and a second support surface positioned on said second lug, said second fastener being positioned between said second action surface and said second support surface;
a first stop surface positioned on said first lug adjacent to said first support surface;
a second stop surface positioned on said second lug adjacent to said second support surface;
said method comprising:
tightening said first adjustable fastener until said first stop surfaces contact one another; and thereafter
tightening said second adjustable fastener until said second stop surfaces contact one another.

12. The method according to claim 11, further comprising:
tightening said first adjustable fastener such that said first action surfaces contact one another before said first stop surfaces contact one another; and thereafter continue tightening said first adjustable fastener such that said first support surfaces contact one another before said first stop surfaces contact one another; and thereafter continue tightening said first adjustable fastener until said first stop surfaces contact one another; and thereafter tightening said second adjustable fastener such that said second action surfaces contact one another before said second stop surfaces contact one another; and thereafter continue tightening said second adjustable fastener such that said second support surfaces contact one another before said second stop surfaces contact one another; and thereafter continue tightening said second adjustable fastener until said second stop surfaces contact one another.

13. The method according to claim 11, wherein each of said first and second adjustable fasteners comprises a nut and bolt, said tightening steps comprising applying torque to one of said nut or said bolt.

14. The method according to claim 11, wherein each of said segments comprises first and second arcuate projections positioned on opposite sides of said segments, each of said arcuate projections facing said central space, each of said arcuate projections being engageable within circumferential grooves in said pipe elements when said segments are drawn toward one another by said adjustable fasteners.

15. The method according to claim 11, further comprising positioning a seal within said central space, said seal supporting said segments in spaced apart relation sufficient to permit insertion of said pipe elements into said central space without disassembling said coupling before said tightening steps.

* * * * *